(12) United States Patent
Liu et al.

(10) Patent No.: US 12,314,493 B2
(45) Date of Patent: May 27, 2025

(54) KNOB ON TOUCH PANEL AND RELATED CONTROL CIRCUIT

(71) Applicant: NOVATEK Microelectronics Corp., Hsin-Chu (TW)

(72) Inventors: Chun-Yuan Liu, Tainan (TW); Yun-Hsiang Yeh, Hsinchu (TW); Yen-Heng Chen, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 48 days.

(21) Appl. No.: 18/143,613

(22) Filed: May 5, 2023

(65) Prior Publication Data

US 2024/0370101 A1   Nov. 7, 2024

(51) Int. Cl.
*G06F 3/0362* (2013.01)
*G06F 3/038* (2013.01)
*G06F 3/041* (2006.01)
*B60K 35/10* (2024.01)

(52) U.S. Cl.
CPC ............ *G06F 3/0362* (2013.01); *G06F 3/038* (2013.01); *G06F 3/041* (2013.01); *B60K 35/10* (2024.01); *B60K 2360/126* (2024.01); *B60K 2360/1434* (2024.01)

(58) Field of Classification Search
CPC .. G06F 3/04883; G06F 3/0488; G06F 3/0482; G06F 3/04842; G06F 3/0485; G06F 3/017; G06F 3/0484; G06F 3/04845; G06F 3/041; G06F 3/0416; G06F 3/0412; G06F 3/044; G06F 3/167; G06F 3/048; G06F 2203/04808; G06F 1/1626; G06F 1/163; G06F 9/451
See application file for complete search history.

(56) References Cited

U.S. PATENT DOCUMENTS

| | | | | |
|---|---|---|---|---|
| 6,534,970 | B1* | 3/2003 | Ely | G01D 5/2086 324/207.17 |
| 11,847,306 | B1* | 12/2023 | Lee | G06F 3/0362 |
| 2021/0055806 | A1* | 2/2021 | Shepelev | B60K 35/10 |
| 2021/0223907 | A1* | 7/2021 | Hoch | G06F 3/0443 |
| 2021/0286470 | A1* | 9/2021 | Takada | G06F 3/0445 |
| 2022/0113812 | A1* | 4/2022 | Kakinoki | G06F 3/0227 |
| 2022/0244810 | A1* | 8/2022 | Fong | G06F 3/0442 |
| 2022/0342503 | A1* | 10/2022 | Kakinoki | G06F 3/0393 |
| 2022/0413631 | A1 | 12/2022 | Kakinoki | |
| 2024/0019947 | A1* | 1/2024 | Hirakawa | G06F 3/0362 |

FOREIGN PATENT DOCUMENTS

| | | |
|---|---|---|
| CN | 104765492 A | 7/2015 |
| CN | 112771640 A | 5/2021 |
| TW | 202113560 A | 4/2021 |

* cited by examiner

Primary Examiner — Dong Hui Liang
(74) Attorney, Agent, or Firm — Winston Hsu

(57) ABSTRACT

A knob on a touch panel includes a plurality of sensing electrodes and at least one conducting wire. The at least one conducting wire is coupled between the plurality of sensing electrodes. Wherein, the plurality of sensing electrodes are separated by a plurality of gaps, and the size of a first gap among the plurality of gaps is different from the size of a second gap among the plurality of gaps.

17 Claims, 17 Drawing Sheets

T1

Signal amount   Distance

⇩ Turning the knob

T2

Signal amount   Distance

KNOB ON TOUCH PANEL AND RELATED CONTROL CIRCUIT

BACKGROUND OF THE INVENTION

1. Field of the Invention

The present invention relates to a knob sensing technology for a touch panel, and more particularly, to a knob sensing technology for a touch panel in automotive applications.

2. Description of the Prior Art

Touch function gradually becomes popular in the center information display (CID) systems of vehicles. When the environmental settings in a car, such as the temperature of air condition and the volume of car audio, need to be adjusted, the driver has to pay more attention to the touch positions and related setting values shown on the screen, therefore affecting the driving safety.

In order to improve the driving safety, a knob on touch display is applied to the CID system, where a physical knob is deployed on the touch screen. Therefore, the driver can easily adjust the settings by controlling the knob without being distracted to watch the display values.

A conventional knob on touch display generates capacitive sensing signals when the knob is touched by a hand or finger of the driver. However, the conventional knob for automotive usage may not support glove control, where the sensing capability may be degraded when the driver is wearing gloves.

SUMMARY OF THE INVENTION

It is therefore an objective of the present invention to provide a knob on a touch panel and a related control circuit, so as to solve the abovementioned problems.

An embodiment of the present invention discloses a knob on a touch panel. The knob comprises a plurality of sensing electrodes and at least one conducting wire. The at least one conducting wire is coupled between the plurality of sensing electrodes. Wherein, the plurality of sensing electrodes are separated by a plurality of gaps, and the size of a first gap among the plurality of gaps is different from the size of a second gap among the plurality of gaps.

Another embodiment of the present invention discloses a knob on a touch panel. The knob comprises a plurality of sensing electrodes and at least one conducting wire. The at least one conducting wire is coupled between the plurality of sensing electrodes. Wherein, the area of a first sensing electrode among the plurality of sensing electrodes is different from the area of a second sensing electrode among the plurality of sensing electrodes.

Another embodiment of the present invention discloses a control circuit for detecting a knob on a touch panel. The knob contacts a touch sensing region of the touch panel. The control circuit comprises an output driver, a sensor and a processor. The output driver outputs a driving signal to a first part of the touch sensing region and outputs a reference voltage to a second part of the touch sensing region. The sensor receives a plurality of sensing signals from the first part of the touch sensing region in response to the driving signal. The processor, coupled to the sensor, determines a status of the knob according to the plurality of sensing signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
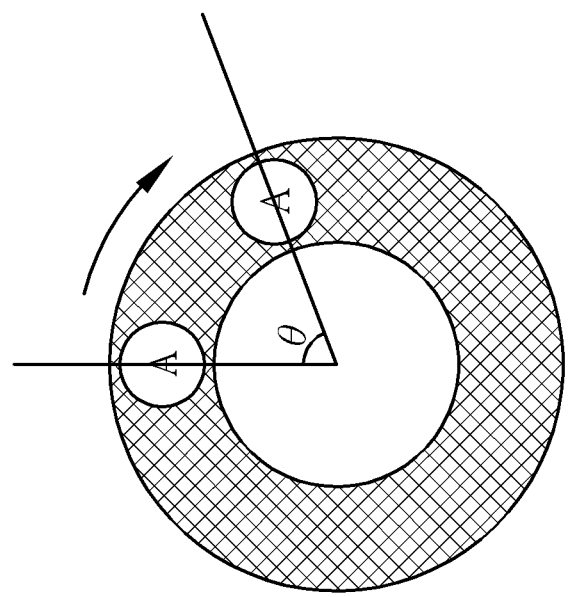
FIG. 1 is a schematic diagram of a self-type knob.
Figure 1:
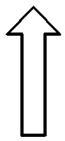
Figure 1:
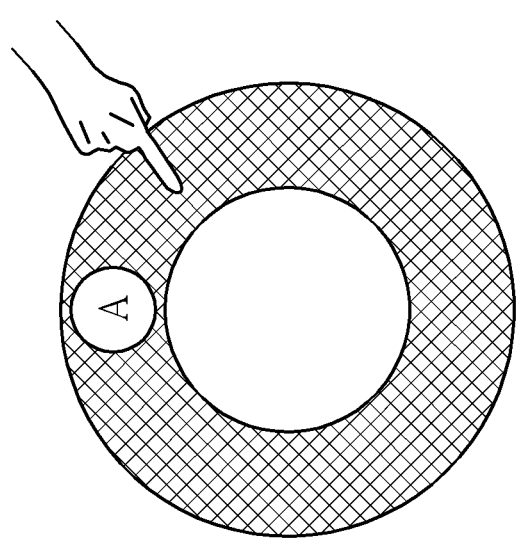

FIG. 1 is a schematic diagram of a self-type knob 10. The sensing operations of the self-type knob 10 are similar to the self-capacitive touch sensing technology of a touch panel, where a finger touch is detected on the knob 10 to correspondingly determine the rotational angle of the knob 10. As shown in FIG. 1, the knob 10 may include an electrode A, and the position of the electrode A may change by turning the knob 10. Based on the position of the electrode A, one or more sensing signals may be generated on the touch panel when a touch finger contacts the knob 10. The information of the sensing signals associated with the position of the electrode A may be sent to a subsequent control circuit, which determines the status of the knob 10 based on the sensing signals. For example, the control circuit may analyze the sensing signals by using an appropriate algorithm to determine the position of the electrode A, thereby determining the rotational angle θ of the knob 10.

As mentioned above, the knob on touch display for automotive applications is requested to support glove control. However, the self-type knob 10 performs capacitive sensing by receiving hand/finger touch of the driver or user. If the driver wears gloves, the sensing signals may be reduced dramatically, such that the sensing capability will be degraded.

Figure 2:
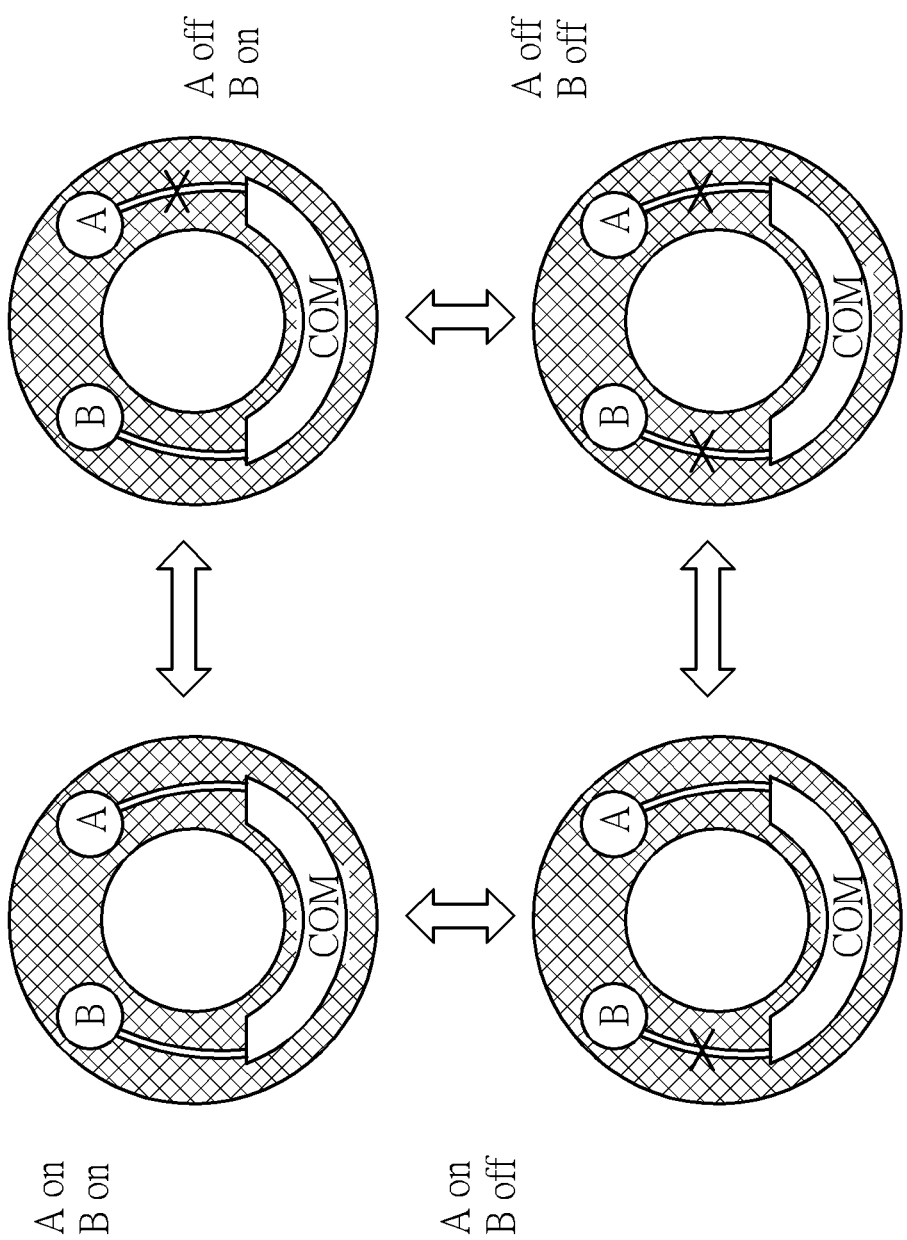
FIG. 2 is a schematic diagram of a mutual-type knob.

FIG. 2 is a schematic diagram of a mutual-type knob 20. As shown in FIG. 2, the mutual-type knob 20 includes sensing electrodes A and B and a common electrode COM. The mutual-type knob 20 may further include conducting wires coupled between the sensing electrodes A and B and the common electrode COM. In detail, based on the status of the knob 20, the sensing electrode A is selectively connected to the common electrode COM through a conducting wire, and the sensing electrode B is selectively connected to the common electrode COM through another conducting wire.

By turning the knob 20, the connectivity between each sensing electrode A, B and the common electrode COM may be controlled, and the control circuit may determine the status of the knob 20 accordingly. For example, in a first status, both the sensing electrodes A and B are connected to the common electrode COM. When the knob 20 is turned to a second status, the conducting wire between the sensing electrode A and the common electrode COM is cut off, while the connection between the sensing electrode B and the common electrode COM keeps on. When the knob 20 is turned to a third status, the conducting wire between the sensing electrode B and the common electrode COM is cut off, while the connection between the sensing electrode A and the common electrode COM keeps on. In a fourth status, both the connections of the sensing electrodes A and B are cut off.

Therefore, the control circuit may determine whether the knob 20 is rotated clockwise or counter-clockwise according to the change of its statuses, i.e., the change of the connectivity between these electrodes. This mutual-type knob 20 is detected by determining the connections and statuses of internal conducting wires, rather than generating sensing signals resulting from hand or finger touch; hence, it will not be affected by gloves.

Note that the common electrode COM of the mutual-type knob 20 is requested to be coupled to ground during the sensing operations. Therefore, the mutual-type knob 20 may not be compatible with a self-capacitive touch panel where the touch sensing electrodes are all applied with the same touch driving signal. In addition, the status of the mutual-type knob 20 corresponds to the connectivity of the sensing electrodes A and B and the common electrode COM, which is an internal mechanical design and is not able to be monitored outside at the beginning. In other words, the back-end control circuit may not know the initial on/off status inside the knob 20 when the system is powered on. The on/off status can be correctly obtained after the knob 20 is rotated at least twice toward the same direction.

Figure 3:
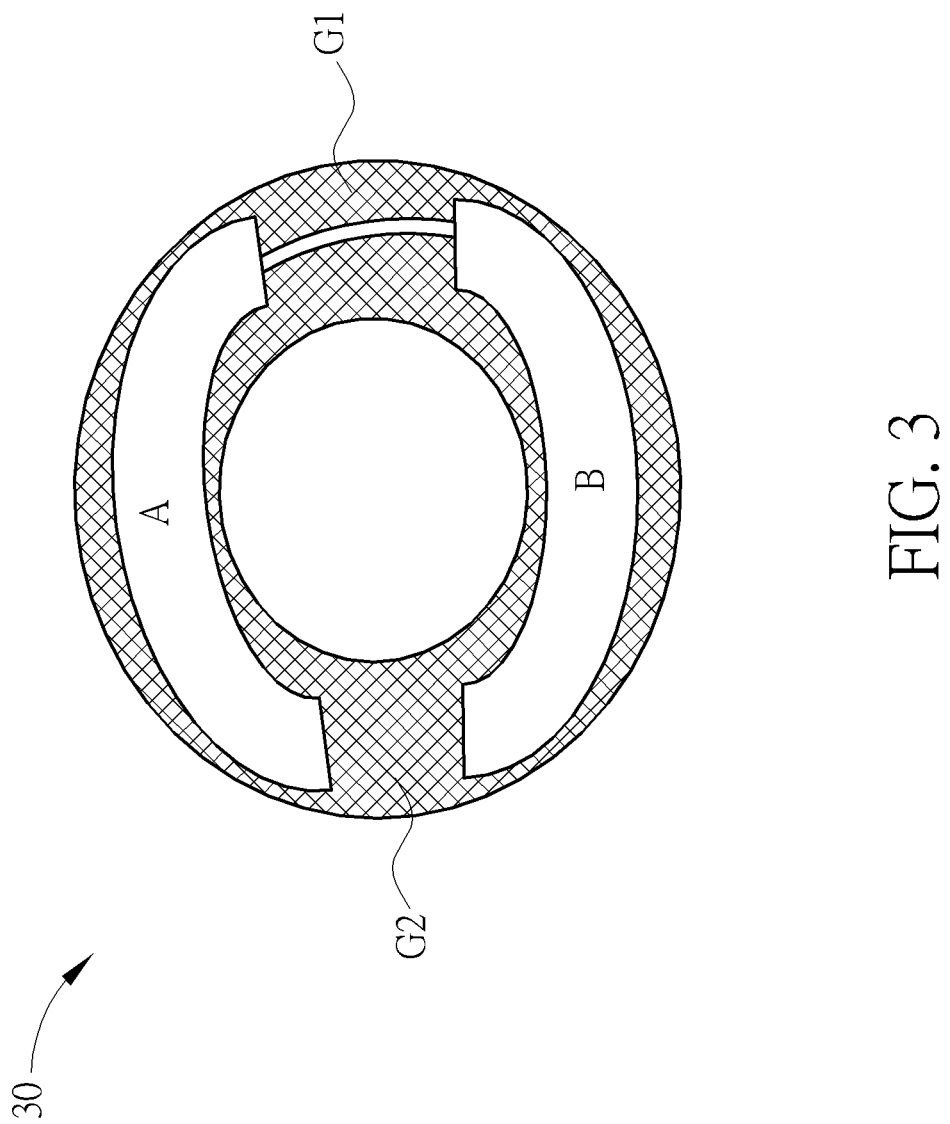
FIG. 3 is a schematic diagram of a knob according to an embodiment of the present invention.

The present invention provides a structure of a knob on touch display which combines the advantages of the self-type knob and the mutual-type knob. FIG. 3 is a schematic diagram of a knob 30 according to an embodiment of the present invention. The knob 30 includes two sensing electrodes A and B and a conducting wire coupled between the sensing electrodes A and B. The sensing electrodes A and B are separated from each other by two gaps G1 and G2. The gaps G1 and G2 have different sizes. More specifically, the size of the gap G1 is larger than the size of the gap G2, as shown in FIG. 3.

The knob 30 may be a physical knob deployed on a touch panel and contact the touch panel, where the sensing electrodes A and B may be exposed metals contacting a touch sensing region of the touch panel covered by the knob 30. The conducting wire may be inside the knob 30 for connecting the sensing electrodes A and B internally. In such a situation, the sensing electrodes A and B may be electrically connected to the touch sensing electrodes in the touch sensing region, to form one or more signal regions during the sensing operations. When the knob 30 is rotated, the positions of the sensing electrodes A and B and the corresponding gaps G1 and G2 may change. The control circuit may perform sensing through the touch sensing region to determine the signal regions, thereby determining the positions of the sensing electrodes A and B and/or the gaps G1 and G2 and determining the status of the knob 30, e.g., the rotational angle of the knob 30. For example, the control circuit may output driving signals to the touch sensing electrodes on the touch sensing region covered by the knob 30, and correspondingly receive sensing signals. Due to the rotations of the knob 30, the displacements of the sensing electrodes A and B may cause the sensing signals from different touch sensing electrodes to have different signal amounts and distributions. The rotational angle of the knob 30 can thereby be determined according to the distribution of the sensing signals.

Different from the mutual-type knob 20 which is sensed by determining the on/off status of the conducting wire coupled between each sensing electrode and the common electrode, the sensing of the knob 30 is performed by receiving the sensing signals from the touch panel that reflect the positions of the sensing electrodes A and B and/or the gaps G1 and G2. In order to realize the sensing operation, at least one of the sensing electrodes A and B should receive a reference voltage such as the ground voltage. Simultaneously, the driving signal may be applied to the touch panel to perform knob sensing.

Therefore, in the touch sensing region covered by the knob 30, there may be a part receiving a touch driving signal, while another part receiving a reference voltage such as the ground voltage. In such a situation, partial touch sensing electrodes in the touch sensing region may be applied with the driving signal and respond with the sensing signals, and other touch sensing electrodes in the touch sensing region may be applied with the ground voltage.

Figure 4:
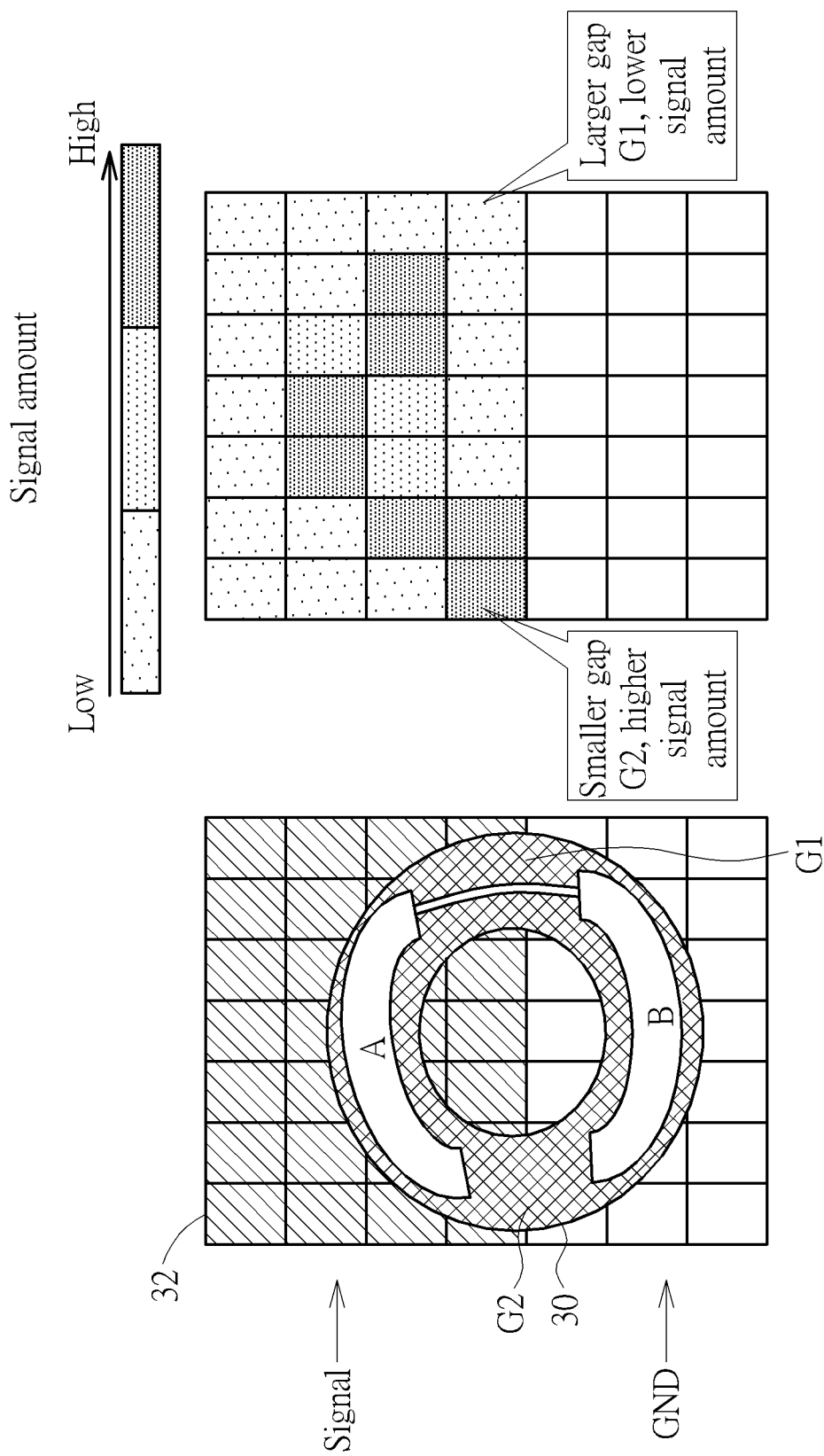
FIGS. 4-7 illustrate exemplary implementations of the driving signal for the knob of FIG. 3 and related sensing signals.

FIG. 4 illustrates an exemplary implementation of the driving signal for the knob 30 and related sensing signals. The knob 30 may be deployed on a touch panel 32, in which each grid may represent one or more touch sensing electrodes configured to output a sensing signal in a sensing cycle. Based on the position of the knob 30, the upper half region covered by the knob 30 is applied with the driving signal, and the lower half region covered by the knob 30 receives the ground voltage. In order to make the sensing operation feasible, the deployment of the sensing electrodes A and B may ensure that at least a part of the sensing electrodes A and/or B may overlap the region receiving the ground voltage (i.e., the lower half region of the touch panel 32 shown in FIG. 4) when the knob 30 is in any possible angle, so that the sensing electrodes A and B may be electrically connected to ground during the sensing operation. In such a situation, the sensing electrodes A and/or B may drive the touch sensing electrodes applied with the driving signal (i.e., those in the upper half region of the touch panel 32 shown in FIG. 4) to generate the sensing signals having different signal amounts.

In an embodiment, the knob sensing operation may be integrated with the touch sensing operation of the touch panel on which the knob is deployed, and these operations may be integrated in the control circuit and performed time-divisionally. For example, a period of sensing time may be divided into a touch term and a knob term. During the touch term, the control circuit may output a touch driving signal to each touch sensing electrode on the touch panel and correspondingly receive touch sensing signals. During the knob term, the control circuit may output a knob driving signal (which may have a similar waveform as the touch driving signal) to the touch sensing electrodes in a first region (e.g., the upper half region) and output a ground voltage to the touch sensing electrodes in a second region (e.g., the lower half region).

FIG. 4 shows the distribution of sensing signal amounts corresponding to the status of the knob 30. As shown in FIG.

4, the touch sensing electrodes at the right side generally have lower sensing signal amounts than those at the left side. By using an appropriate algorithm, the control circuit may determine that the larger gap G1 is rotated to the right side and the smaller gap G2 is rotated to the left side.

Figure 5:
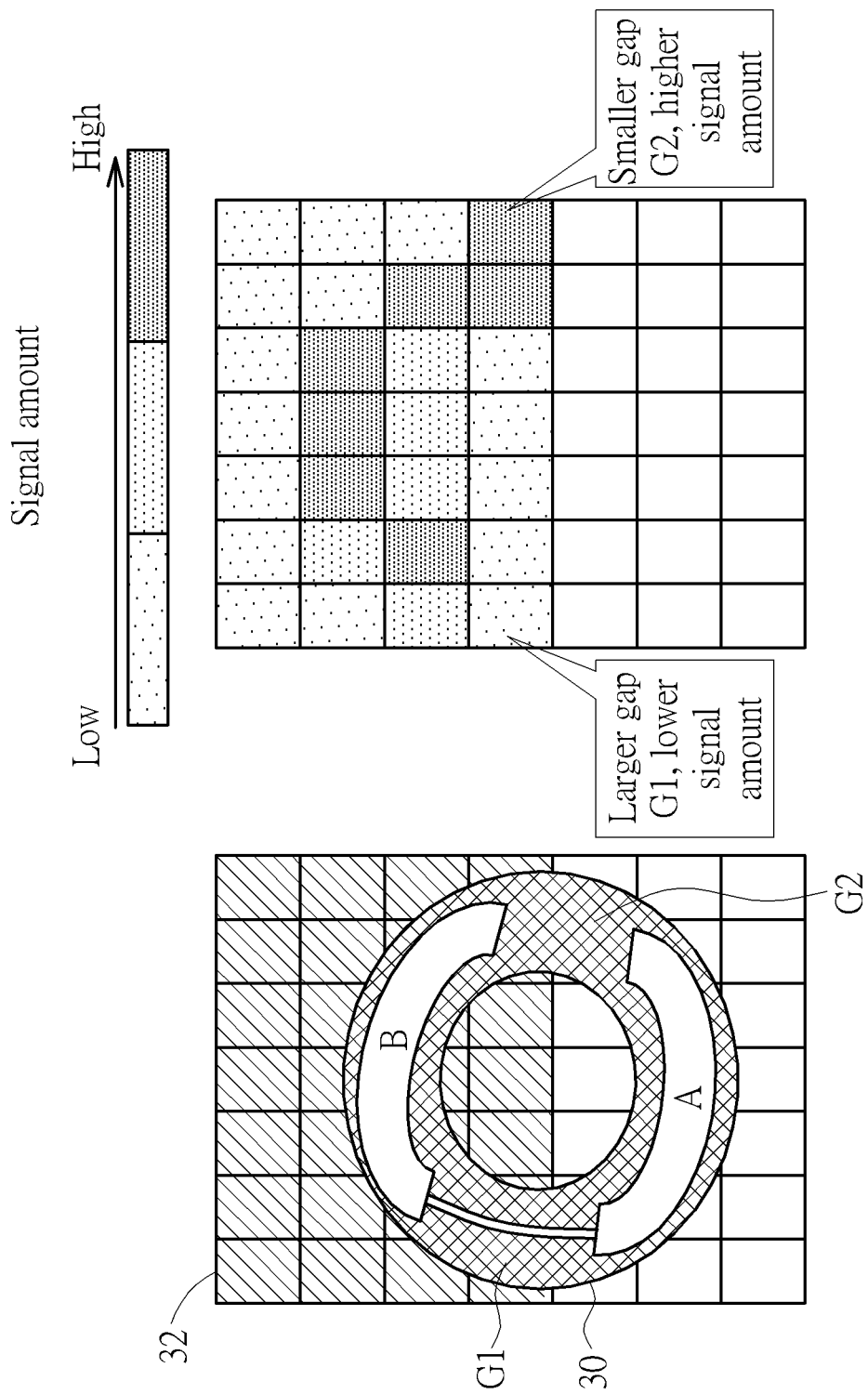

On the other hand, if the knob 30 is rotated to another angle where the larger gap G1 is at the left side and the smaller gap G2 is at the right side, the sensing signals may be distributed to have higher signal amounts at the right side and lower signal amounts at the left side, as shown in FIG. 5. In such a situation, the control circuit may determine that the knob 30 is at a status where the sensing electrode B is rotated to the upper side and the sensing electrode A is rotated to the lower side.

Figure 6:
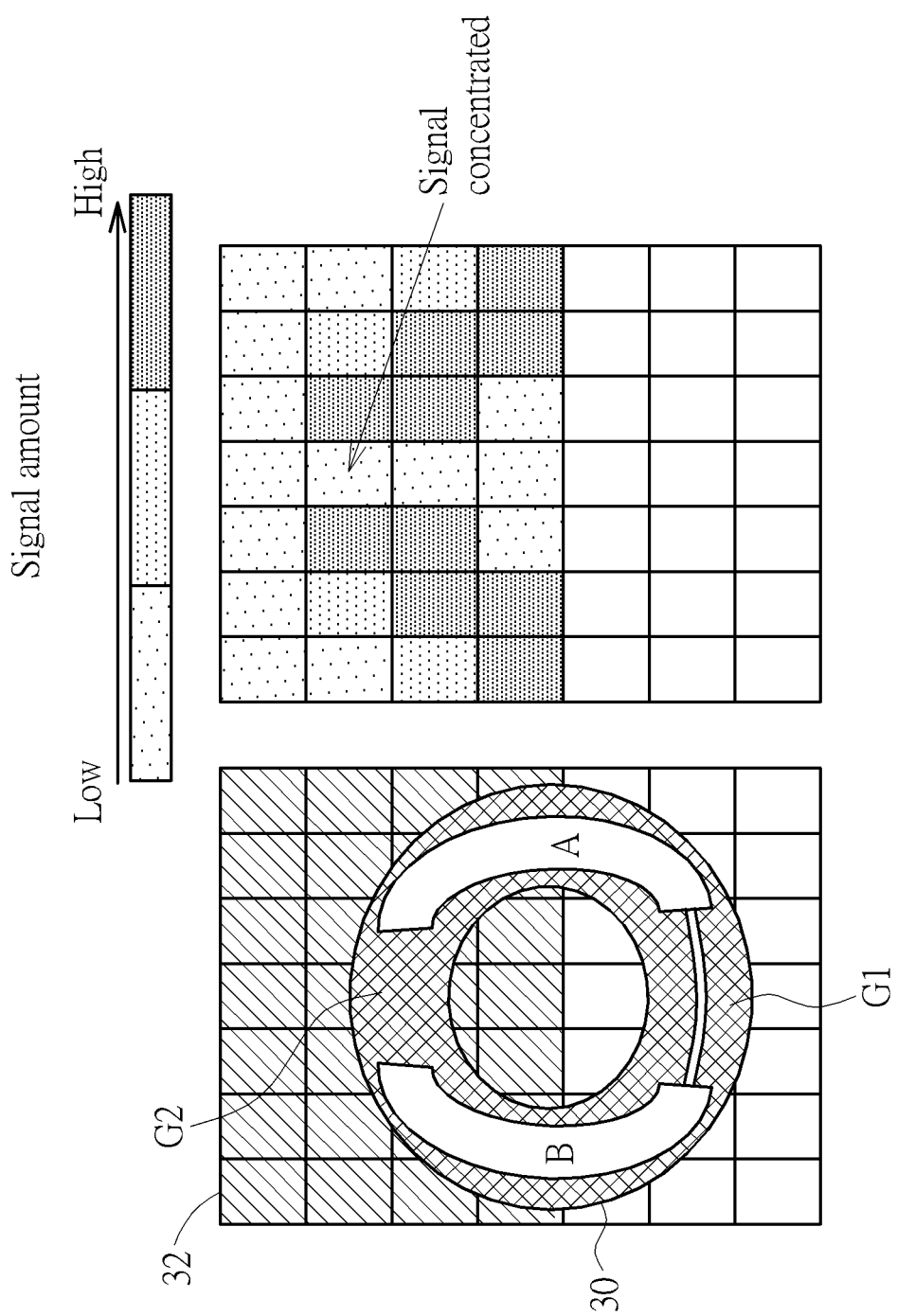
Figure 7:
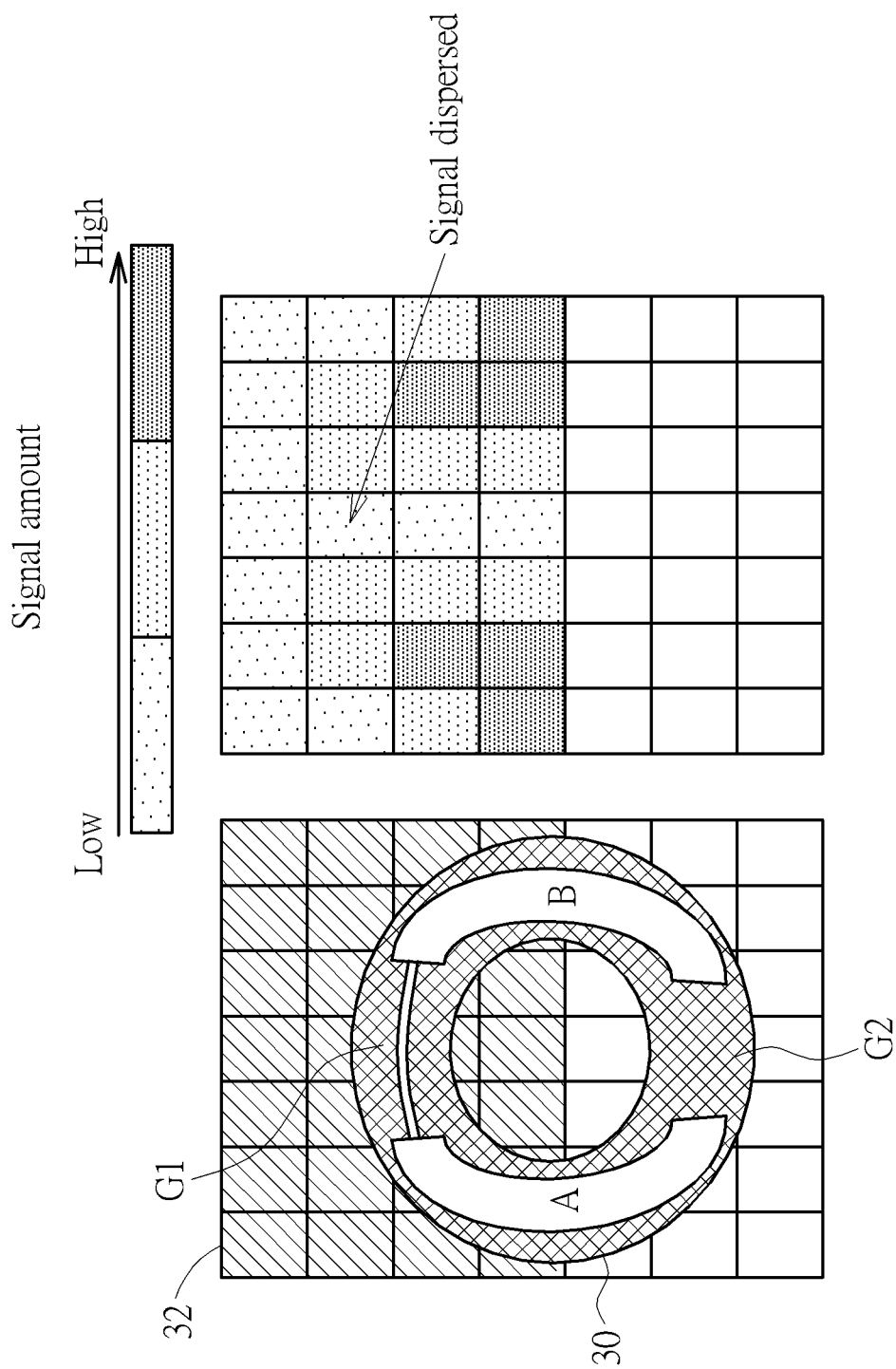

FIGS. 6 and 7 show other distributions of sensing signals caused by rotation of the knob 30. The sensing signals may be distributed to have higher amounts at the left and right sides and lower amounts at the upper side. In FIG. 6, the signal distribution at the upper side is relatively concentrated, and thus the control circuit may determine that the gap rotated to the upper side is G2. In FIG. 7, the signal distribution at the upper side is relatively dispersed, and thus the control circuit may determine that the gap rotated to the upper side is G1.

Note that the structure of the knob 30 shown in FIG. 3 is merely an exemplary embodiment of the present invention. In fact, the sensing electrodes and the related gaps may be deployed in any appropriate manner, to generate different sensing signal distributions identifiable by the back-end control circuit. For example, there may be more sensing electrodes included in the knob, where the sensing electrodes may be separated by more gaps, and each sensing electrode may be connected to other sensing electrodes through at least one conducting wire.

Figure 8:
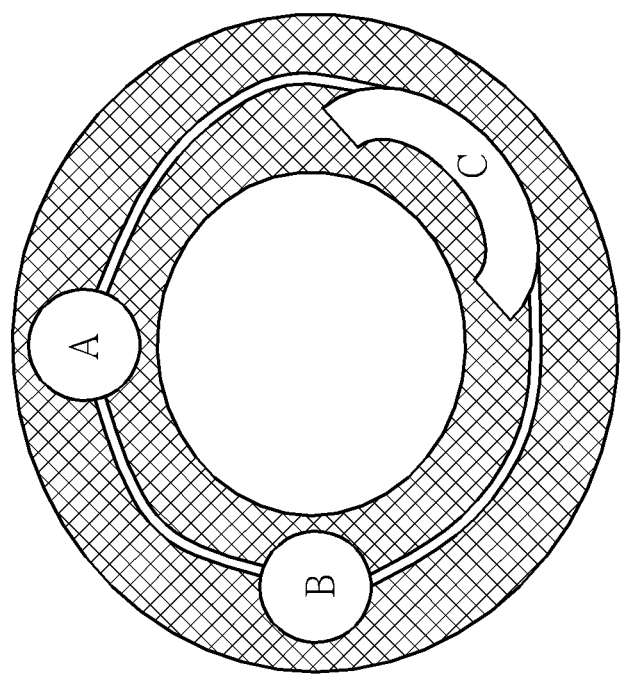
FIG. 8 is a schematic diagram of another knob according to an embodiment of the present invention.

FIG. 8 is a schematic diagram of another knob 80 according to an embodiment of the present invention. The knob 80 includes three sensing electrodes A, B and C, which are electrically connected to each other through conducting wires to form a ring structure. Therefore, the sensing electrodes A, B and C may be separated by 3 gaps. Similarly, the rotation of the knob 80 may change the positions of the sensing electrodes A, B and C.

In this embodiment, the shape of the sensing electrode C is different from the shape of the sensing electrodes A and B. More specifically, the sensing electrodes A and B are rounded electrodes, while the sensing electrode C is a flattened and curved electrode. Since the sensing electrode C has another shape, the sensing signal distribution and amounts generated by the sensing electrode C may be different from those generated by the sensing electrode A or B. Based on the difference of shapes of the sensing electrodes, the control circuit may be able to differentiate the positions of the sensing electrodes based on the distribution of the sensing signals.

In addition, in this embodiment, the area of the sensing electrode C is larger than the area of the sensing electrodes A and B. The difference of areas will generate different signal amounts in the corresponding signal regions. Accordingly, the control circuit may be able to differentiate the positions of the sensing electrodes based on the signal amounts of the sensing signals.

Figure 9:
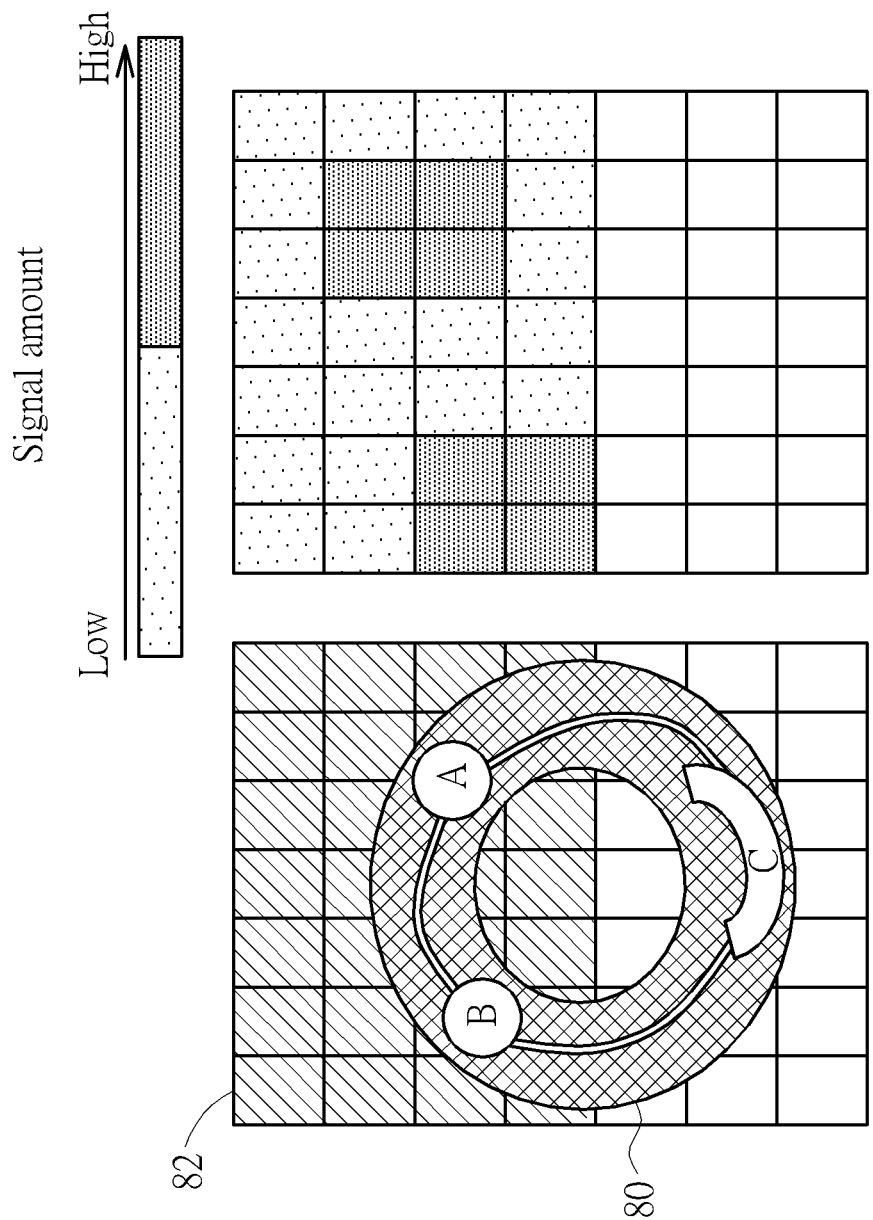
FIGS. 9-11 illustrate exemplary implementations of the driving signal for the knob of FIG. 8 and related sensing signals.
Figure 10:
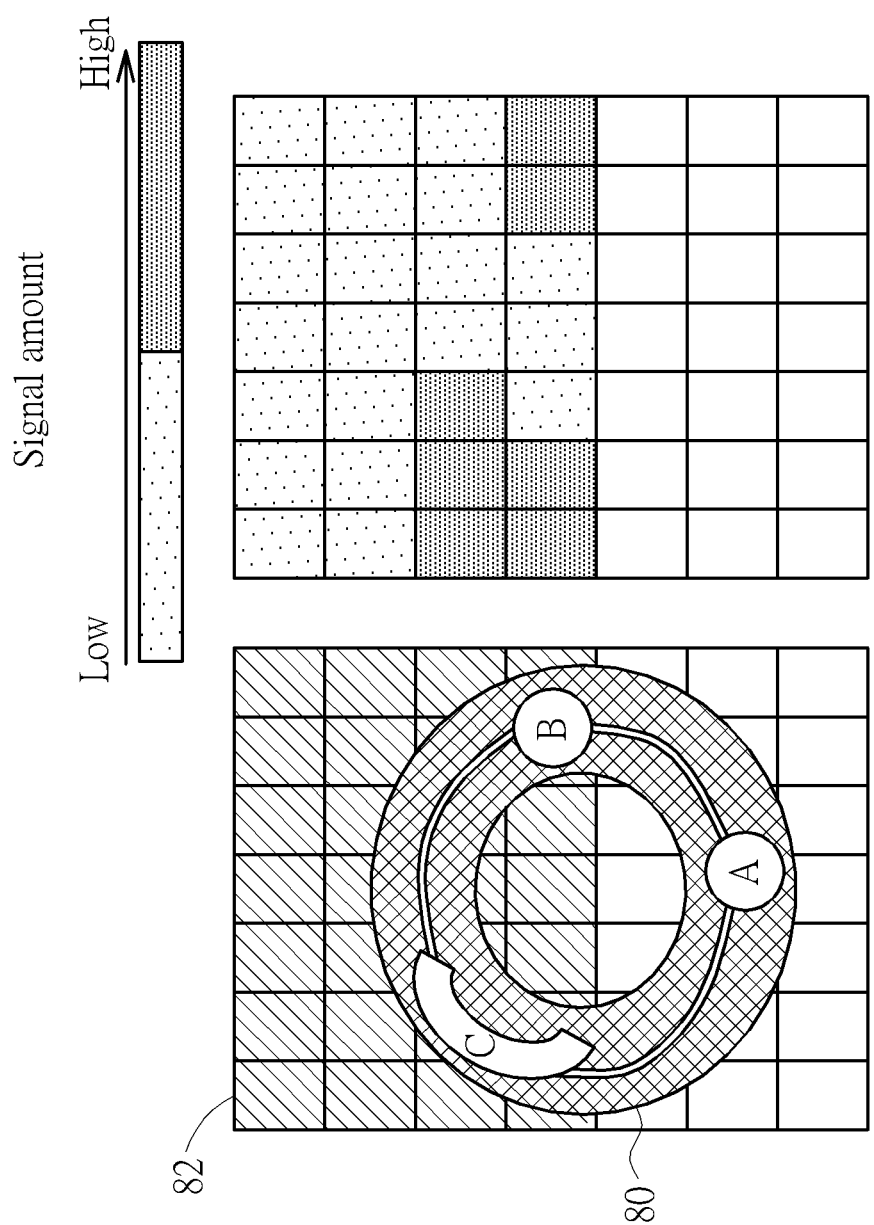
Figure 11:
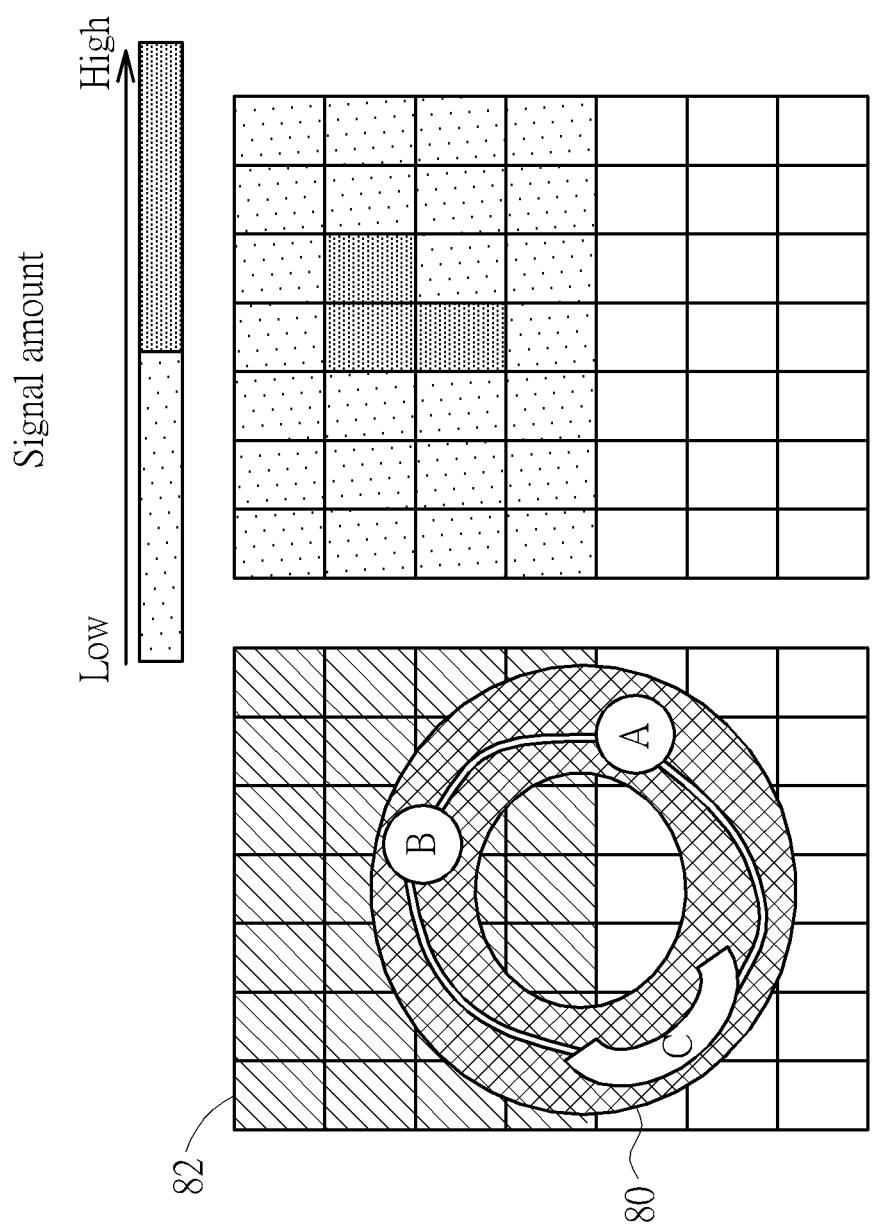

FIGS. 9, 10 and 11 illustrate several exemplary implementations of the driving signal for the knob 80 and related sensing signals. The knob 80 may be deployed on a touch panel 82 having multiple sensing electrodes represented by grids. Similarly, based on the position of the knob 80, the upper half region covered by the knob 80 is applied with the driving signal, and the lower half region covered by the knob 80 receives the ground voltage. Therefore, partial sensing electrodes are coupled to the touch sensing electrodes at the lower half region to be electrically connected to ground, and other sensing electrodes are coupled to the touch sensing electrodes at the upper half region to be applied with the driving signal to perform sensing.

As shown in FIG. 9, the sensing signals are distributed to indicate two small signal regions at the upper half region. Based on the signal amounts and distribution, the control circuit may determine that the sensing electrodes A and B are rotated to the upper side.

As shown in FIG. 10, the sensing signals are distributed to indicate a larger signal region at the left side and a smaller signal region at the right side. Based on the signal amounts and distribution, the control circuit may determine that the sensing electrode C having a larger area is rotated to the left side, and thus the sensing signals at the right side may be generated by the sensing electrode B.

As shown in FIG. 11, the sensing signals are distributed to indicate a small signal region at the upper side. Based on the signal amounts and distribution, the control circuit may determine that the sensing signals at the upper side may be generated by the sensing electrode A or B. Note that the rotation of the knob 80 is a continuous operation; hence, the control circuit may identify the rotation of the knob 80 according to continuous variations of a series of previous knob statuses and the present knob status, so as to determine which one of the sensing electrodes A and B is currently rotated to the upper side. In this embodiment, the sensing electrode B is rotated to the upper side.

Figure 12:
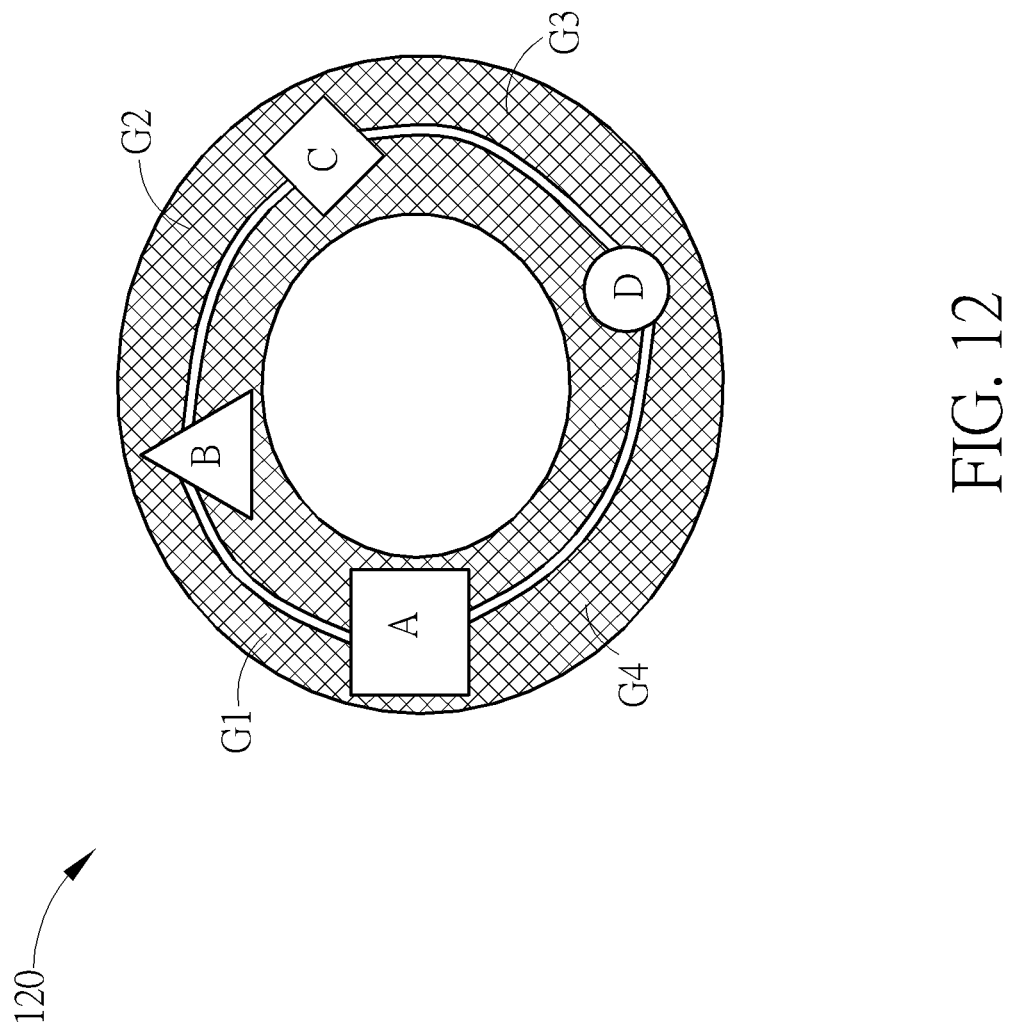
FIG. 12 is a schematic diagram of a further knob according to an embodiment of the present invention.

FIG. 12 is a schematic diagram of a further knob 120 according to an embodiment of the present invention. The knob 120 provides sensing electrodes having different shapes, areas, and gap sizes, allowing the control circuit to determine the rotational angle of the knob 120 by identifying the sensing signals having different signal amounts and distributions generated by different sensing electrodes.

In detail, the knob 120 includes sensing electrodes A, B, C and D, which are connected to each other through conducting wires to form a ring structure. The sensing electrodes A, B, C and D may be separated by 4 gaps G1, G2, G3 and G4. More specifically, the gap G1 is located between the sensing electrodes A and B, the gap G2 is located between the sensing electrodes B and C, the gap G3 is located between the sensing electrodes C and D, and the gap G4 is located between the sensing electrodes D and A. The gaps G1, G2, G3 and G4 all have different sizes, where the gap sizes are in an order of G4>G3>G2>G1. The sensing electrodes A, B, C and D all have different shapes and areas, where their areas are in an order of A>B>C>D. As for the shapes, the sensing electrode A is rectangular, the sensing electrode B is triangular, the sensing electrode C is diamond-shaped, and the sensing electrode D is circular. The rotational angle of the knob 120 may be determined based on the signal amounts generated by different sensing electrodes and also based on the distance between two signal regions that corresponds to the gap size.

Since the knob 120 has more sensing electrodes as compared to the knobs 30 and 80 and their gaps are all different, there may be more different sensing signal distributions in response to the rotation of the knob 120, which facilitates the determination of rotational angle.

Figure 13:
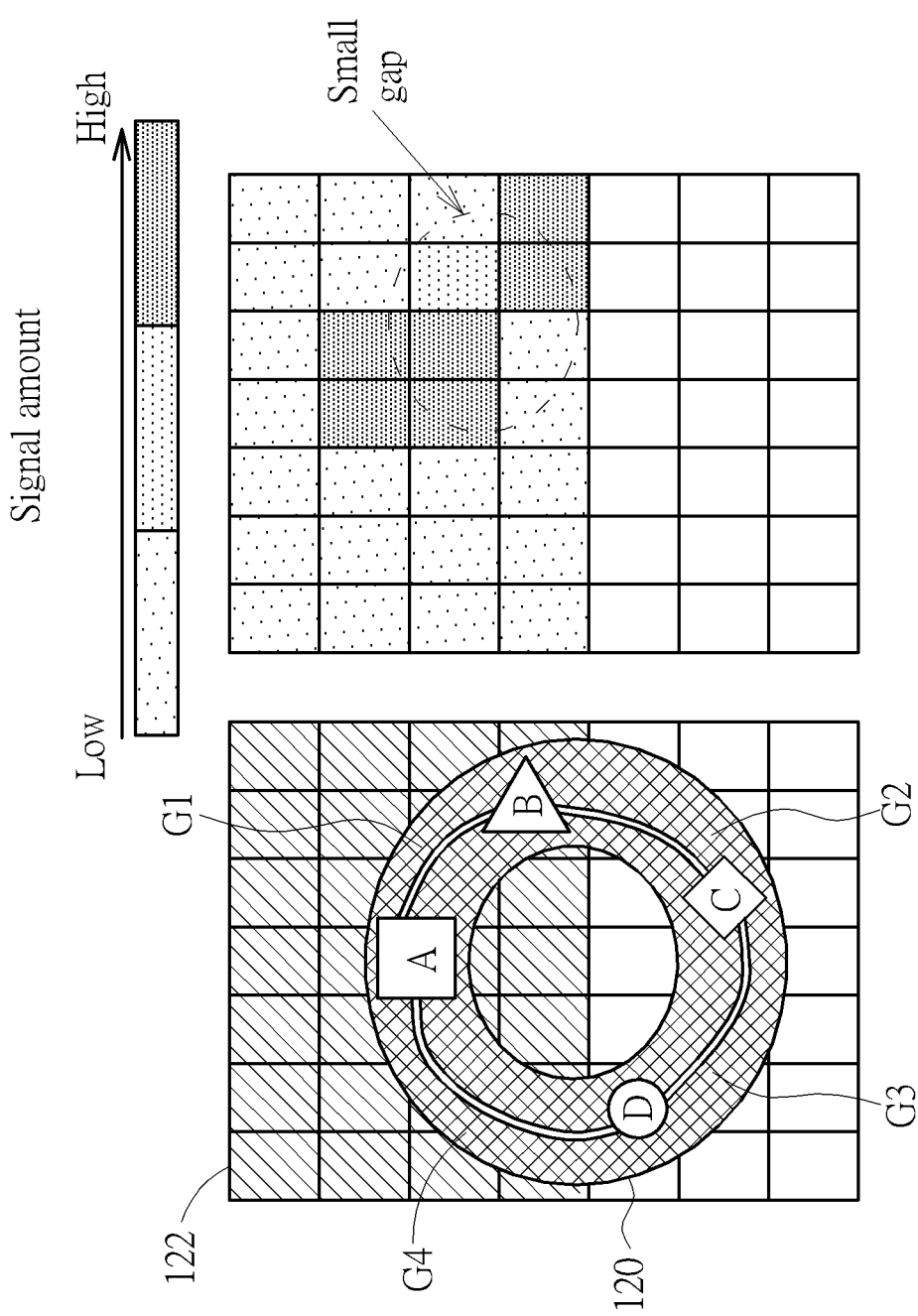
FIGS. 13-14 illustrate exemplary implementations of the driving signal for the knob of FIG. 12 and related sensing signals.
Figure 14:
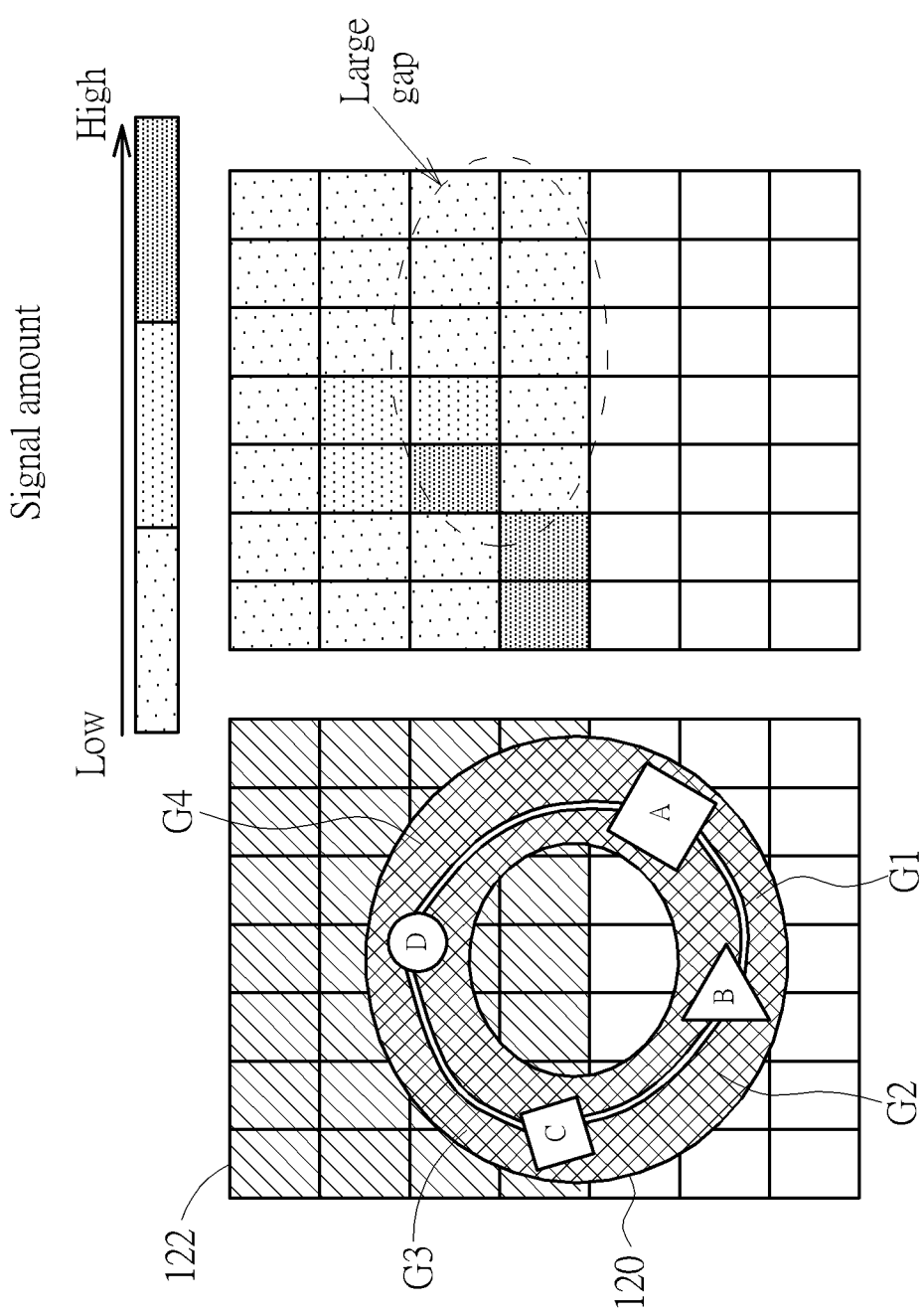

For example, FIGS. 13 and 14 illustrate several exemplary implementations of the driving signal for the knob 120 and related sensing signals. The knob 120 may be deployed on a touch panel 122 having multiple sensing electrodes represented by grids. Similarly, the upper half region with respect to the position of the knob 120 is applied with the driving signal, and the lower half region with respect to the position of the knob 120 receives the ground voltage.

As shown in FIG. 13, the sensing signals are distributed to indicate two close signal regions at the upper right side, where the upper signal region indicates a rectangular distribution and the right signal region indicates a nearly triangular distribution. Based on the signal amounts and distribution, the control circuit may determine that there is a small gap at the upper right side for separating the rectangular signal region and the triangular signal region, and thereby determine that the sensing electrodes A and B having the gap G1 therebetween are rotated to the upper right side.

As shown in FIG. 14, the sensing signals are distributed to indicate two sensing regions at the upper left side and no sensing region at the upper right side, where the upper sensing region has lower signal amounts. Based on the signal amounts and distribution, the control circuit may determine that there is a large gap at the upper right side and that the upper sensing region having lower signal amounts may be generated by the smallest sensing electrode D, and thereby determine that the sensing electrodes D and A having the gap G4 therebetween are rotated to the right side.

Figure 15:
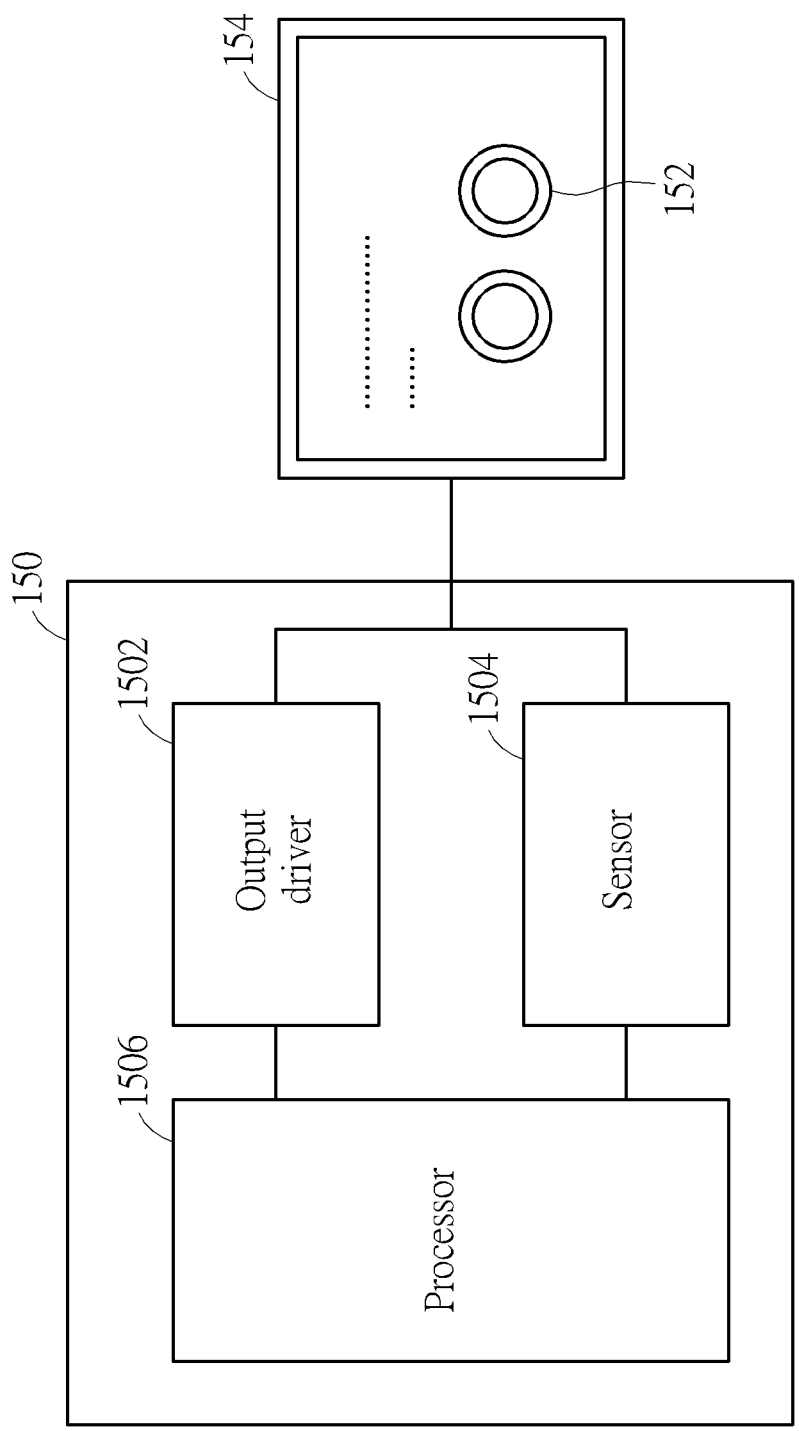
FIG. 15 is a schematic diagram of a control circuit according to an embodiment of the present invention.

FIG. 15 is a schematic diagram of a control circuit 150 according to an embodiment of the present invention. The control circuit 150 includes an output driver 1502, a sensor 1504 and a processor 1506. The control circuit 150 may be configured to control at least one knob 152 on a touch panel 154, where the knob 152 and the touch panel 154 are also shown in FIG. 15 to facilitate the illustrations. The control circuit 150 may be an integrated circuit (IC) implemented in a chip, such as a touch and display driver integration (TDDI) circuit. The knob 152 may be any knob having sensing electrodes with gaps and connected with conducting wire(s) as described in this disclosure, but not limited thereto. The touch panel 154 may be a screen of the center information display (CID) system of a vehicle, but not limited thereto.

As shown in FIG. 15, the knob 152 may be deployed on the active area of the touch panel 154 and contact a touch sensing region of the touch panel 154. The output driver 1502 is configured to output a driving signal to a first part of the touch sensing region and output a reference voltage such as the ground voltage to a second part of the touch sensing region. In an embodiment, the driving signal may be applied to the upper half part of the touch sensing region and the ground voltage may be output to the lower half part of the touch sensing region, as specified in the above descriptions. Alternatively, the driving signal may be applied to the lower half part, left half part, or right half part of the touch sensing region covered by the knob 152, while another half part may receive the ground voltage. In addition, the area of the touch sensing region receiving the driving signal may be larger than, equal to, or smaller than the area of the touch sensing region receiving the ground voltage. As long as the sensing electrodes of the knob are electrically connected to ground and also driven by the driving signal during the sensing operation, the knob sensing will be feasible.

The sensor 1504 is configured to receive a plurality of sensing signals in response to the driving signal. As described above, the driving signal is applied to the first part of the touch sensing region, and thus the sensing signals are received from the first part of the touch sensing region. More specifically, each sensing signal may be received from a touch sensing electrode, and the distribution of the sensing signals may be associated with the position, area and shape of the sensing electrodes of the knob and their gaps. In an embodiment, the driving signal may include multiple pulses similar to the touch driving signal of self-capacitive touch sensing operations, and the sensing signals may be voltage signals reflecting the capacitance sensed by the sensing electrodes. In such a situation, the sensor 1504 may be integrated with the output driver 1502 in an IC (e.g., a TDDI circuit) to realize the knob sensing operations.

Subsequently, the sensor 1504 may forward the sensing signals to the processor 1506, or convert the sensing signals into data to be forwarded to the processor 1506. The processor 1506 may thereby determine the status of the knob 152, e.g., the rotational angle of the knob 152, according to the sensing signals. In an embodiment, the processor 1506 may determine the status of the knob 152 according to the distribution of signal amounts of the sensing signals. In an embodiment, the knob 152 may include multiple sensing electrodes, and the sensing signals may indicate one or more signal regions corresponding to the sensing electrode(s), allowing the processor 1506 to determine the position of the sensing electrode(s) and thereby determine the status of the knob 152. Alternatively or additionally, the processor 1506 may determine the gap of signal regions, which may be corresponding to the gap separating the sensing electrodes on the knob 152; hence, the processor 1506 may determine the position of the gap and thereby determine the status of the knob 152.

In order to realize the above operations of determining the rotational angles, the processor 1506 may be configured with an algorithm for identifying the positions of the sensing electrodes and gaps based on the sensing signal distribution received from the touch panel. The processor 1506 may be any processing device, module or circuit included in an IC, such as a central processing unit (CPU), microprocessor, microcontroller unit (MCU), but not limited thereto.

Figure 16:
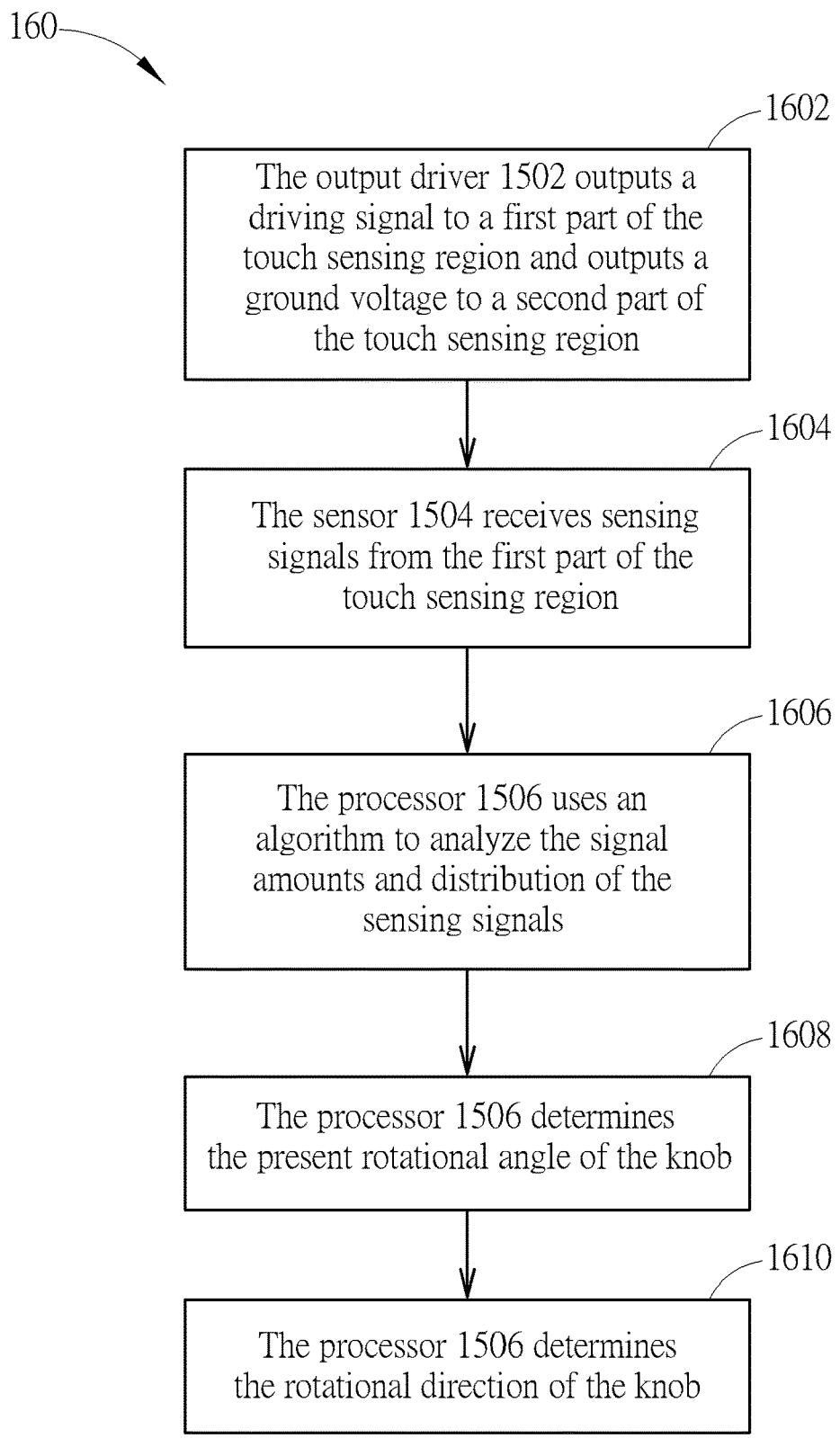
FIG. 16 is a flowchart of a knob sensing process according to an embodiment of the present invention.

The operations of knob sensing of the present invention may be summarized into a knob sensing process 160, as shown in FIG. 16. The knob sensing process 160 may be implemented in a control circuit for detecting a knob on touch display, such as the control circuit 150 shown in FIG. 15. As shown in FIG. 16, the knob sensing process 160 includes the following steps:

Step 1602: The output driver 1502 outputs a driving signal to a first part of the touch sensing region and outputs a ground voltage to a second part of the touch sensing region.

Step 1604: The sensor 1504 receives sensing signals from the first part of the touch sensing region.

Step 1606: The processor 1506 uses an algorithm to analyze the signal amounts and distribution of the sensing signals.

Step 1608: The processor 1506 determines the present rotational angle of the knob.

Step 1610: The processor 1506 determines the rotational direction of the knob.

The knob sensing process 160 may start when the control circuit detects a rotation of the knob, to determine the rotational direction based on the present rotational angle and the previous rotational angle of the knob. The operations of determining the rotational angle and direction of the knob may be realized by applying an appropriate algorithm in the processor 1506.

Figure 17:
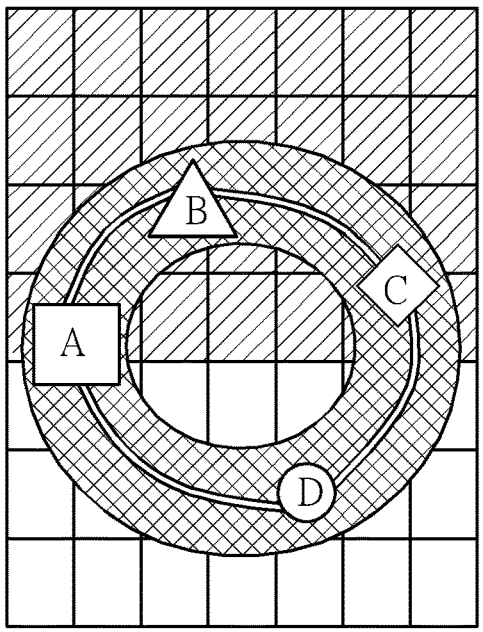
FIG. 17 illustrates the operations of analyzing the sensing signal amount and the distance of signal regions to determine the rotational angle of the knob.
Figure 17:
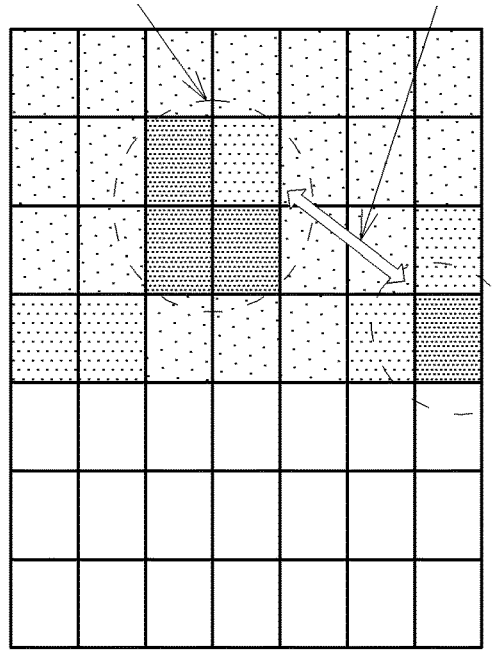
Figure 17:
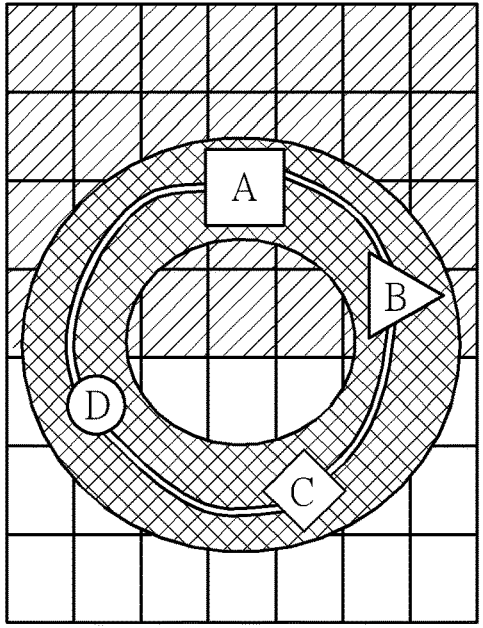
Figure 17:
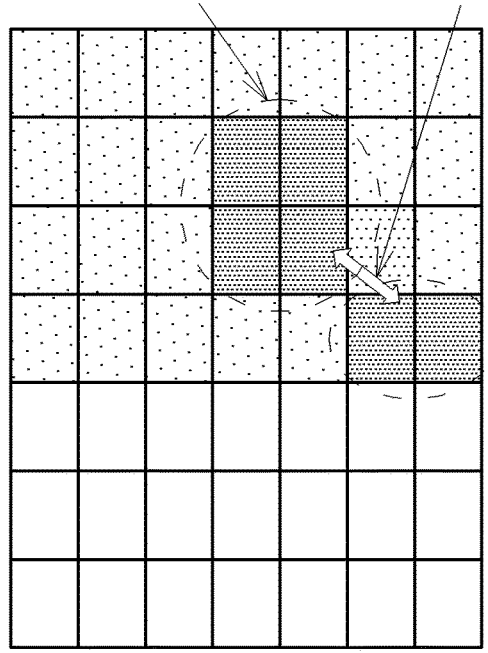

For example, as for the knob 120 having 4 sensing electrodes A, B, C and D with different gap sizes as shown in FIG. 12, the algorithm of the processor 1506 may be used to analyze the sensing signal amounts and the distance of signal regions to determine the rotational angle. For example, as shown in FIG. 17, in the knob term T1, the processor 1506 may analyze the sensing signal amounts and the distance of signal regions, to determine that the sensing electrode B is at the upper side and the sensing electrode C is at the right side, and determine the rotational angle accordingly. In the next knob term T2, the processor 1506 may analyze the sensing signal amounts and the distance of signal regions, to determine that the sensing electrode A is at the upper side and the sensing electrode B is at the right side, and determine the rotational angle and direction accordingly.

Please note that the present invention aims at providing a knob on a touch panel and related control circuit and sensing method. Those skilled in the art may make modifications and alterations accordingly. For example, in the above embodiments, the knob is hollow with the sensing electrodes deployed at the peripheral region and connected to form a ring structure. In another embodiment, the knob may be solid without any hole, and the sensing electrodes may be deployed in any manner that can generate different sensing signal distributions based on the rotational angle of the knob. For example, in a solid knob of the present invention, a sensing electrode may be deployed at the central region for receiving the ground voltage, and this central sensing electrode is connected to other sensing electrodes at the peripheral region for performing sensing by receiving the knob driving signal. In fact, the shape and type of the knob are not limited to those described in this disclosure.

Since the knob of the present invention performs sensing by receiving the ground voltage by one or more sensing electrodes while receiving the driving signal by other sensing electrodes, to determine the sensing behavior based on the signal distribution generated by different electrode positions, areas and gaps, the user does not need to physically contact the knob. In such a situation, the glove control in automotive applications will be feasible, where the driver can control the knob when wearing gloves.

In addition, the algorithm of the processor may determine the rotational angle and direction of the knob based on the sensing signal amounts and distribution. If the design of sensing electrodes and their gaps are sufficiently diversified, the processor may easily determine the present knob status without considering its previous statuses; hence, the knob sensing operation may be easily initialized when the system is powered on.

To sum up, the present invention provides a novel structure of a knob on touch display. The knob may include multiple sensing electrodes which are separated by multiple gaps. The sensing electrodes may be connected inside the knob through conducting wire(s). The touch sensing region on the touch panel covered by the knob may be partially applied with a driving signal and partially coupled to ground, to ensure that at least a part of the sensing electrodes overlaps the region coupled to ground while the sensing electrodes receive the driving signal. In response to the driving signal, the sensing electrode(s) of the knob may generate sensing signals to form signal region(s) on the touch panel. In an embodiment, different gaps of sensing electrodes may have different sizes, allowing the back-end control circuit or processor to determine the distance of signal regions, so as to determine the rotational angle and/or direction of the knob. Alternatively or additionally, different sensing electrodes may have different shapes and/or areas, allowing the back-end control circuit or processor to determine the signal amounts and distribution of the sensing signals, so as to determine the rotational angle and/or direction of the knob. As a result, the knob status may be correctly determined. The knob of the present invention may support glove control, to be feasible in the center information display (CID) system in automotive applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A knob on a touch panel, comprising:
   a plurality of sensing electrodes; and
   at least one conducting wire coupled between the plurality of sensing electrodes;
   wherein the plurality of sensing electrodes are separated by a plurality of gaps;
   wherein the size of a first gap among the plurality of gaps is different from the size of a second gap among the plurality of gaps;
   wherein the different sizes of the plurality of gaps generate different capacitive signal amounts;
   wherein each of the plurality of sensing electrodes is connected to at least one of other sensing electrodes among the plurality of sensing electrodes through the at least one conducting wire without through any circuit device.

2. The knob of claim 1, wherein the plurality of sensing electrodes are electrically connected to a touch sensing region of the touch panel, and a first part of the touch sensing region receives a driving signal and a second part of the touch sensing region receives a reference voltage.

3. The knob of claim 2, wherein at least a part of at least one of the plurality of sensing electrodes is on the second part of the touch sensing region when the knob is in each angle.

4. The knob of claim 1, wherein the area of a first sensing electrode among the plurality of sensing electrodes is different from the area of a second sensing electrode among the plurality of sensing electrodes.

5. The knob of claim 1, wherein the shape of a first sensing electrode among the plurality of sensing electrodes is different from the shape of a second sensing electrode among the plurality of sensing electrodes.

6. A knob on a touch panel, comprising:
   a plurality of sensing electrodes; and
   at least one conducting wire coupled between the plurality of sensing electrodes;
   wherein the area of a first sensing electrode among the plurality of sensing electrodes is different from the area of a second sensing electrode among the plurality of sensing electrodes;
   wherein the different areas of the plurality of sensing electrodes generate different capacitive signal amounts;
   wherein each of the plurality of sensing electrodes is connected to at least one of other sensing electrodes among the plurality of sensing electrodes through the at least one conducting wire without through any circuit device.

7. The knob of claim 6, wherein the plurality of sensing electrodes are electrically connected to a touch sensing region of the touch panel, and a first part of the touch sensing region receives a driving signal and a second part of the touch sensing region receives a reference voltage.

8. The knob of claim 7, wherein at least a part of at least one of the plurality of sensing electrodes is on the second part of the touch sensing region when the knob is in each angle.

9. The knob of claim 6, wherein the plurality of sensing electrodes are separated by a plurality of gaps, and the size of a first gap among the plurality of gaps is different from the size of a second gap among the plurality of gaps.

10. The knob of claim 6, wherein the shape of the first sensing electrode is different from the shape of the second sensing electrode.

11. A control circuit for detecting a knob on a touch panel, the knob contacting a touch sensing region of the touch panel, the control circuit comprising:
- an output driver to output a driving signal to a first part of the touch sensing region and output a reference voltage to a second part of the touch sensing region;
- a sensor to receive a plurality of sensing signals from the first part of the touch sensing region in response to the driving signal; and
- a processor, coupled to the sensor, to determine a status of the knob according to the plurality of sensing signals;
- wherein the knob comprises a plurality of sensing electrodes separated by a plurality of gaps;
- wherein the plurality of sensing electrodes have different areas or the plurality of gaps have different sizes to generate different capacitive signal amounts;
- wherein each of the plurality of sensing electrodes is connected to at least one of other sensing electrodes among the plurality of sensing electrodes through at least one conducting wire without through any circuit device.

12. The control circuit of claim 11, wherein the area of a first sensing electrode among the plurality of sensing electrodes is different from the area of a second sensing electrode among the plurality of sensing electrodes.

13. The control circuit of claim 11, wherein the shape of a first sensing electrode among the plurality of sensing electrodes is different from the shape of a second sensing electrode among the plurality of sensing electrodes.

14. The control circuit of claim 11, wherein the size of a first gap among the plurality of gaps is different from the size of a second gap among the plurality of gaps.

15. The control circuit of claim 11, wherein the processor determines the status of the knob according to a distribution of signal amounts of the plurality of sensing signals.

16. The control circuit of claim 11, wherein the processor determines the status of the knob by determining the position of at least one sensing electrode among the plurality of sensing electrodes.

17. The control circuit of claim 11, wherein the processor determines the status of the knob by determining the position of at least one gap among the plurality of gaps.

* * * * *